(12) United States Patent
Vatanen

(10) Patent No.: US 6,957,342 B2
(45) Date of Patent: Oct. 18, 2005

(54) SECURITY MODULE, SECURITY SYSTEM AND MOBILE STATION

(76) Inventor: Harri Vatanen, 2 Rushmore Place, Englefield Green, Surrey (GB), TW20 0NN ( * ) Notice: Subject to any disclaimer, the term of this patent is extended or adjusted under 35 U.S.C. 154(b) by 337 days.

(21) Appl. No.: 09/799,444

(22) Filed: Mar. 5, 2001

(65) Prior Publication Data

US 2002/0114467 A1 Aug. 22, 2002

(30) Foreign Application Priority Data

Sep. 4, 1998 (FI) .................................................. 981902
Sep. 1, 1999 (WO) ................................ PCT/FI99/00713

(51) Int. Cl.[7] .............................................. G06F 12/14
(52) U.S. Cl. ...................... 713/192; 713/200; 713/300; 455/556.1; 380/247; 380/37; 380/270
(58) Field of Search ............................ 455/572–575.1; 380/37–42, 247, 270; 713/192–200, 300

(56) References Cited

U.S. PATENT DOCUMENTS

| | | | | |
|---|---|---|---|---|
| 5,534,366 A | * | 7/1996 | Hwang et al. | 429/91 |
| 5,541,985 A | * | 7/1996 | Ishii et al. | 379/111 |
| 5,742,756 A | | 4/1998 | Dillaway et al. | |
| 5,786,106 A | * | 7/1998 | Armani | 429/98 |
| 5,924,044 A | * | 7/1999 | Vannatta et al. | 455/556.1 |
| 5,960,085 A | * | 9/1999 | de la Huerga | 340/5.61 |
| 5,991,410 A | * | 11/1999 | Albert et al. | 705/78 |
| 6,011,976 A | | 1/2000 | Dervan et al. | |
| 6,088,450 A | * | 7/2000 | Davis et al. | 713/182 |
| 6,119,179 A | * | 9/2000 | Whitridge et al. | 710/72 |
| 6,179,649 B1 | * | 1/2001 | An | 439/500 |
| 6,244,894 B1 | * | 6/2001 | Miyashita | 439/500 |
| 6,434,159 B1 | * | 8/2002 | Woodward et al. | 370/401 |
| 6,442,532 B1 | * | 8/2002 | Kawan | 705/35 |
| 6,643,566 B1 | * | 11/2003 | Lehr et al. | 700/286 |
| 2003/0028481 A1 | * | 2/2003 | Flitcroft et al. | 705/39 |

FOREIGN PATENT DOCUMENTS

| | | |
|---|---|---|
| DE | 19526730 | 2/1996 |
| DE | 19732762 | 11/1998 |
| FI | 956022 | 12/1995 |
| WO | WO 98/16080 | 4/1998 |
| WO | WO 99/01848 | 1/1999 |

OTHER PUBLICATIONS

Nash, Daniel C., et al, 'Towards an Intrusion Detection System for Battery Exhaustion Attacks on Mobile Computing Devices' Mar. 8, 2005, Tech, Dept. of ECE, entire document, http://www.ece.vt.edu/~tlmartin/power-secure/nashd_martint_battery_exhaustion.pdf.*
Frenzel, Louis E., 'Highly Integrated Bluetooth IC Simplifies Design', ED Online ID #4122, Mar. 19, 2001, Penton Media, Inc. ,entire document, http://www.elecdesign.com/Articles/Print.cfm?ArticleID=4122.*
PRNewswire, 'Texas Instruments Battery Management IC Increases Battery Safety in Cell Phones and Other Portable Electronics', EETimes Online, CMP Media LLC, Jan. 12, 2005, entire document.*

* cited by examiner

Primary Examiner—Ayaz Sheikh
Assistant Examiner—Ronald Baum
(74) Attorney, Agent, or Firm—Cohen, Pontani, Lieberman & Pavane

(57) ABSTRACT

A security module, a security system and a mobile station for utilizing and use with the module and system enable ready implementation of services and devices that afford a high level of data security using standard devices without required modifications of the standard devices to implement banking and other services requiring high data security. A security module uses a standardized local interface for transmission of the messages to be transmitted. Messages can be transmitted in real time without any significant delays introduced by the telecommunication network to effect the encryption functionality.

12 Claims, 2 Drawing Sheets

SECURITY MODULE, SECURITY SYSTEM AND MOBILE STATION

BACKGROUND OF THE INVENTION

1. Field of the Invention

The present invention relates to a security module and, in particular, to a new and improved security module and security system for processing and transmitting various messages requiring a high degree of data security. The invention is also directed to a mobile station that utilizes the novel security module.

2. Description of Related Art

In mobile communication networks, as for example GSM (Global System for Mobile Communications) networks, heavy encryption is used with the transmission of speech over the radio link between the mobile station and base station. In addition to speech, communication of text or data messages has increased and, with rising and enhanced levels of service, services relying on the communication of text or data have gained ground. Text communication can be utilized in implementing a wide variety of service functions, as for example in effecting payment for services.

At present, one source of difficulties in the encryption of messages lies in the fact that in mobile telephones consistent with current standards for mobile communication, it is not possible to make changes that would facilitate encryption because the user interfaces used in the telephones are manufacturer-specific. The only component that is sufficiently standardized yet open in respect of encryption is the subscriber identity module (SIM).

Mobile telephones consistent with a current mobile communication standard, such as the GSM standard, do not directly provide for the encryption of text-based communication via mobile stations. Thus, although text communication can advantageously be used to implement services, such as banking services, that require a high level of data security, such services cannot become popular unless and until suitable encryption of message communication is possible.

Another problem with the use of mobile communication networks is that currently-implemented message transmission services are not necessarily real-time services and the transmission of such messages can take considerable time. This transmission delay can pose particular difficulties where, for example, a user wishes to pay for his/her shopping at the cash register of a store. In such circumstances, even a slight delay in message transmission will significantly retard execution of the payment transaction and discourage use of the network and, perhaps, result in a loss of the transaction or sale. At present, no part of the mobile communication standard supports local communication between a mobile station and a cash register terminal.

A group of the world's leading enterprises in telecommunications and information technology has developed a technology that permits establishment of a wireless connection between a mobile telephone and, for example, a portable computer. That technology, which has been designated "Bluetooth", is based on short-range radio technology and can be used to interconnect many types of terminals. A more detailed description of the Bluetooth specification and technology can be found on the World Wide Web at www.bluetooth.com.

Bluetooth technology permits the interconnection of devices via a short-range radio link, and enables establishment of a connection, as between a mobile station and a portable computer, without cumbersome cabling. Printers, work stations, facsimile devices, keyboards and virtually any digital apparatus may form parts of a Bluetooth system or network. The technology provides a universal bridge to existing data networks and peripherals and a means for forming small private groups via interconnected devices without a fixed network infrastructure. In addition, encryption and authentication can be used in the communication between Bluetooth-connected devices permitting, for example, only a predetermined user's mobile telephone to be used with a particular portable computer.

Also heretofore known are smart cards that enable reliable personal authentication and signature reliance. The sphere of applications for such smart cards is virtually unlimited; examples of possible applications include a national electronic identity card (EID), encryption of files, telecommunication and electronic mail, a means for signing of documents, electronic currency, driver's license, voting ballot, and so on.

Although the smart card can be used in the ways described above, there remains a problem in that a separate reading device must still be provided and available for communicating with the smart card. Moreover, the smart card alone is incapable of communicating over any telecommunication network, as a result of which updating of information, as through the use of short messages, is not possible.

In addition, even were it possible to effect a local connection between a mobile station and a cash register terminal using Bluetooth technology and thus utilize the mobile station as a payment instrument, there remains the lack of a facility for providing the encrypted and secure data communication needed for payment transactions.

There is in the prior art no known general-purpose security module which could be connected to different cash register and automated systems, to mobile stations and to other portable devices for safe and secure communication, as between a host device on the one hand and a service provider's device on the other, utilizing the Bluetooth technology or the like with suitable encryption to meet the high data security requirements imposed by banks and authorities.

OBJECTS AND SUMMARY OF THE INVENTION

It is accordingly the desideratum of the present invention to overcome and eliminate the problems, drawbacks and deficiencies of the prior art as for example hereinabove described.

It is a particular object of the invention to provide a new type of general-purpose security module that can be used in a wide variety of application environments for establishing an encrypted and secure local communication connection. Another and associated object of the invention is to provide a security system that provides means for encrypted data communication between a user and service provider.

It is a further object of the invention to provide a new type of mobile station that can be used for local communication with a service provider's terminal at a high level of data security to realize, when used with the inventive security module, a general-purpose security apparatus which can be connected and used in any environment.

It is another object of the invention to provide a device configured such that the manufacturer can be directly certified as a so-called reliable third party, thereby obviating the need to have an encryption property separately added, by a reliable third party, to a device (such as a mobile telephone) produced by a particular manufacturer.

The present invention provides a security module comprising connection means for connecting the security module to a terminal, such as a mobile station, cash register terminal, on-line banking terminal, portable computer, telephone or any like or similar terminal or device. The security module is intended to be a general-purpose module for connection to telecommunication networks and telecommunication terminals to implement the required encryption operations in applications requiring a high level of data security.

In accordance with the invention, the security module comprises encryption means for encrypting electronic data transfer effected via the security module, for decrypting encrypted information, and for implementing an electronic signature. The encryption means preferably comprises a processor operable to encrypt, to decrypt and to implement an electronic signature. In addition, the encryption means comprises a memory connected to the processor for the storage of the encryption keys and parameters required by the processor to perform the intended functionality.

In further accordance with the invention, the security module comprises a first connection interface for connecting the security module to an external device for electronic data transfer, and a power source for supplying power to power consuming security module components, i.e. the processor and the memory. The power source may also be replaced by or implemented using the power source of the host device to which the security module is connected, to thereby supply power to the security module directly from the host device (and vice versa). The connection interface may by way of example be implemented using Bluetooth technology which is well known and the subject of ongoing standardization efforts and proceedings. The particulars of Bluetooth technology shall accordingly not be described herein.

The security module may further comprise a smart card unit arranged to implement smart card functions with the security module. The smart card unit can use the connection interface for communication with external devices, such as with cash register terminals and on-line banking terminals and the like to utilize and download electronic money. Thus, the invention renders the use of a smart card easier and more attractive to both the commercial client and the user.

The security module can be integrated, as for example with the power source of a mobile station, in which case the security module may in a preferred form comprise a housing or casing or frame sized and contoured and fitted to correspond to the shape of (in that example) the mobile station power source and a connector attached to the frame for releasable electrical engagement of the security module to the mobile station in lieu of its standard battery pack or like power source. In this manner connection of the security module to the mobile station provides both power to the station as well as the communication functionality of the security module through the mobile station. The security module is then operable using the keypad of the mobile station.

The invention is also directed to and provides a security system comprising a service provider's terminal, such as an on-line banking terminal, cash register, vending machine or the like, and a service user's terminal, such as a mobile station. In the inventive system, the terminals are electrically interconnected via a preselected communication link, as for example using Bluetooth technology.

In accordance with the invention, the security system comprises a first security module connected to the service provider's terminal and a second security module connected to the service user's terminal. Communication between the terminals is encrypted and decrypted by means of the security modules, which preferably comprise encryption means, a first interface and a power source, as described above in connection with the security module.

The security system may also comprise a service provider server electrically connected to the service provider's terminal; this connection can be established via a telecommunication network such as a GSM network or other suitable network. The first security module may be further connected, via the telecommunication network, to the service provider's terminal to update functions executed via the service user's terminal and to save them to the server; this refers to so-called clearing functions used to transfer, to the service provider's account, electronic money paid for services or shopping by the service user.

The invention also provides a mobile station, which is here intended to denote a typically self-contained terminal comprising a keypad, a display, a radio unit and a power source. A preferred example of this kind of mobile station is a GSM-compatible terminal or GSM wireless mobile telephone.

In accordance with the invention, the mobile station comprises a security module integrated with the mobile station power source and including encryption means and a first connection interface, as described above in conjunction with the security module. The security module is preferably arranged to process information transmitted by the mobile station over a telecommunication network and/or via a local communication interface of the mobile station. The security module may communicate with the mobile station and/or an external terminal or device by using Bluetooth technology.

In contrast to the prior art, the present invention advantageously does not require that existing mobile telephones currently used be modified in any way in order to use them for secure communication. A further advantage of the invention is that the security module is a general-purpose device that can be connected to almost any terminal in which encrypted data transfer is needed.

In addition, the invention enables the implementation of secure systems that may be used by service providers to provide services requiring a high level of data security, such as on-line banking services.

Other objects and features of the present invention will become apparent from the following detailed description considered in conjunction with the accompanying drawings. It should be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE
CURRENTLY PREFERRED EMBODIMENTS

Figure 1:
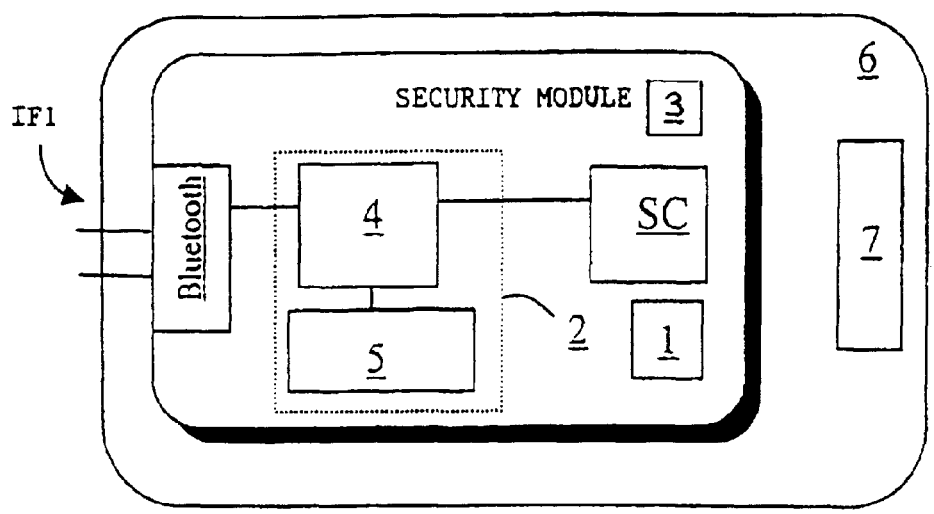
FIG. 1 is a schematic block diagram of a security module in accordance with the present invention.

The security module shown in FIG. 1 includes a connection means 1 for connecting the security module to a communication terminal. The terminal may by way of example be a mobile station MS, a cash register terminal, an on-line banking terminal or any like or corresponding device used to implement applications requiring a high level of data security. The security module further includes an encryption means 2 operative for encrypting electronic data in the security module, for decrypting encrypted information and for generating an electronic signature when instructed or required.

To implement a local network interface or like or equivalent functionality, the security module additionally includes a first connection interface IF1 that permits or accommodates connection of the security module to a terminal, as for example via a radio link for electronic data transfer. In conjunction with the connection interface a so-called Bluetooth component may be provided, as shown in FIG. 1, for implementing the actions required by that technology. The security module is also provided with a power source 3 which may, by way of example, be a chargeable battery pack or accumulator or a mains transformer or the like, for supplying operating power to the security module components which require operating electric power.

The encryption means of FIG. 1 further includes a processor 4, which may be specially designed and optimized for encryption functionality and that is operable for encryption and decryption and to implement electronic signature functionality, and a memory 5 connected to the processor 4 for the storage of encryption keys and parameters needed by the processor. The personal key security module user, parameters of the encryption algorithm used and other data necessary for this functionality may be stored in the memory. A preferred form of the encryption algorithm is the RSA method, but other nonsymmetrical algorithms may also or alternatively be used as a function of the particular application or as otherwise appropriate or desired.

The security module additionally includes a smart card component SC for implementing smart card functions by means of the security module. The smart card component can also operationally utilize the other components of the security module, as for example the interface IF1 for telecommunication connections.

The processor 4 or the smart card component SC of the security module further comprises a clock for synchronizing and clocking the operation and functions of the security module. The clock is synchronized with the clock or timing components of the device to which the security module is connected. Alternatively, or in addition, the clock may be synchronized with the clock of the Bluetooth system.

In a currently contemplated form of the inventive security module, the frame or housing or casing 6 of the security module is configured or fitted to conform to the shape and contours of the normal power source (e.g. rechargeable battery pack) of a mobile station. The frame 6 is also provided with a connector 7 for connecting, preferably through a releasable engagement, the security module to a mobile station. In a preferred embodiment, both the power and data communication connections between the security module and the mobile station can be effected via the connector 7; in this preferred implementation, the power source of the security module substantially corresponds to and thereby replaces the normal power source of the mobile station in respect of capacity and is therefore likewise rechargeable. The security module can thus be readily connected, both mechanically and electrically, to the mobile station.

Figure 2:
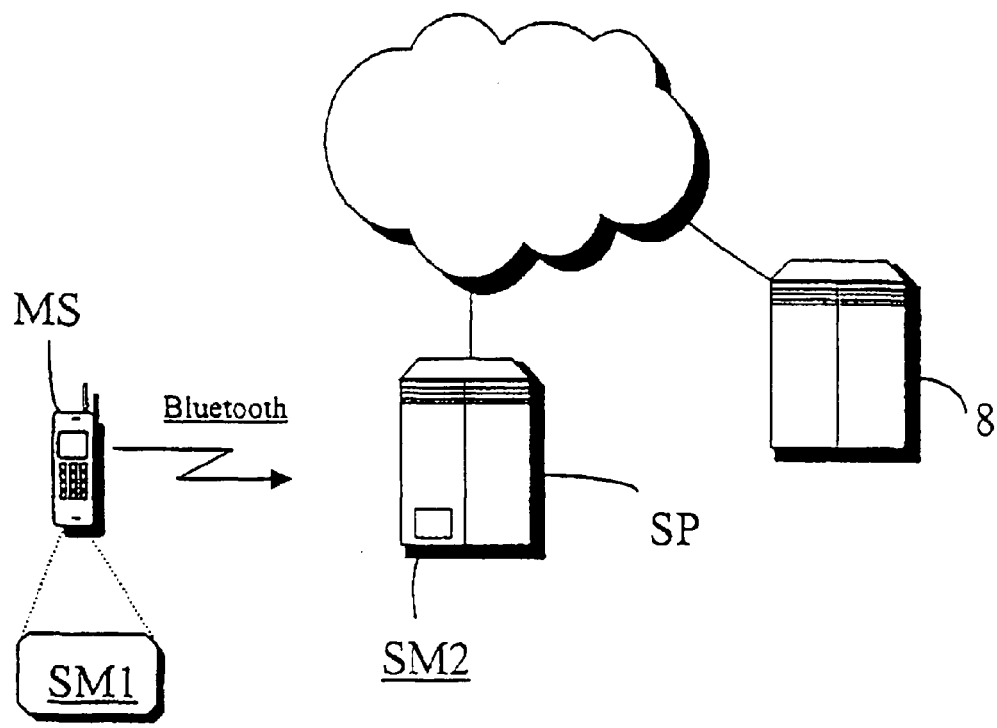
FIG. 2 is a schematic block diagram of a preferred security system in accordance with the present invention.

FIG. 2 depicts by way of example a security system in accordance with the invention. The security system of FIG. 2 comprises a service provider's terminal SP, in this instance an on-line banking terminal, and a service user's terminal MS, in this instance a GSM mobile telephone, which are electrically connected to one other via a predetermined communication link. In this particular system the communication link is established using Bluetooth technology.

The security system of FIG. 2 additionally comprises a first security module SM1 that is connected to the service provider's terminal and a second security module SM2 that is connected to the service user's terminal, the two security modules being arranged to process information transmitted via a telecommunication link between the terminals. Appropriate encryption keys and other parameters are stored in the memories of the security modules SM1 and SM2. Public keys may also be preloaded, as for example from designated public key servers designated or reserved for this purpose.

The security system of FIG. 2 further comprises a service provider's server 8. The first security module is connected to the service provider's server 8 via a telecommunication network, by way of example in this system through a telephone network. In this manner, functions executed by the service user's terminal MS can be updated and saved to the server 8. It should also be understood that the service provider's terminal SP and server 8 may be, physically, the same unit or device or otherwise within the same housing or casing.

Figure 3:
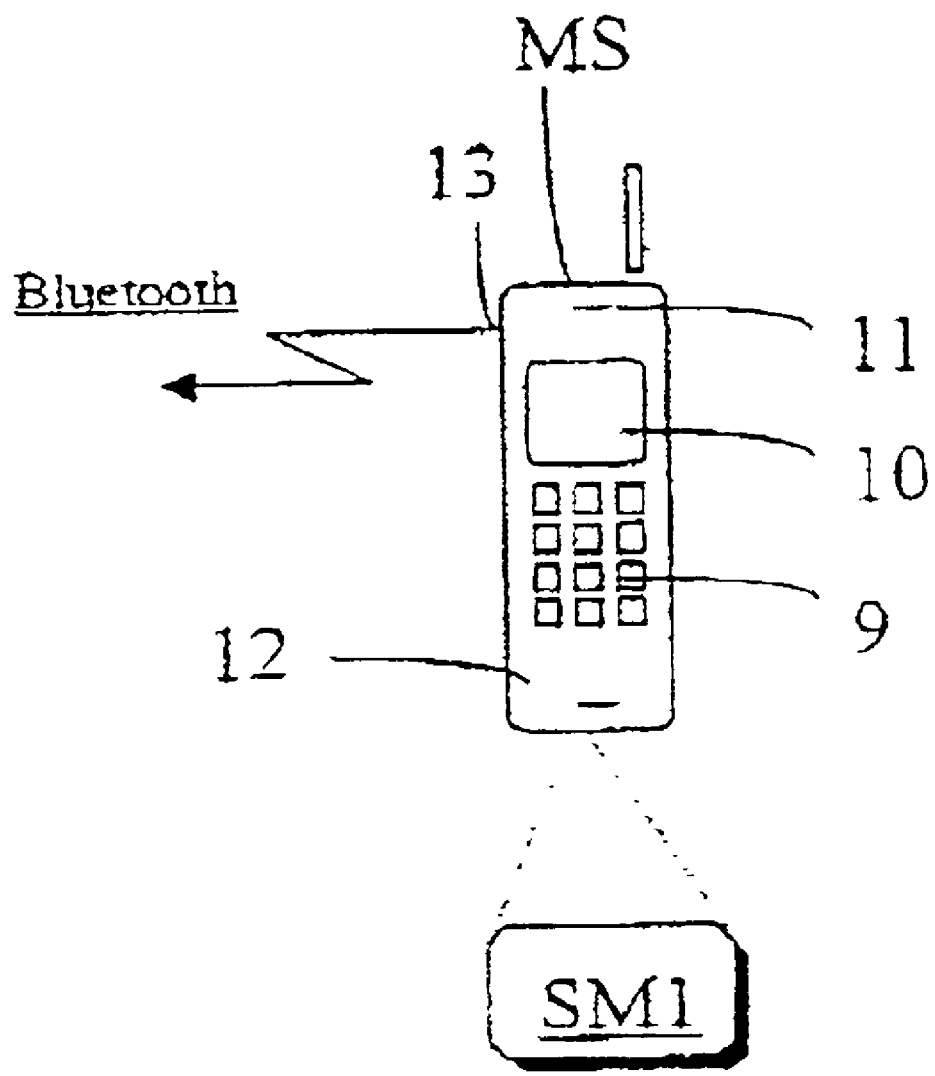
FIG. 3 diagrammatically depicts a preferred mobile station that includes an integrated or associated security module in accordance with the invention.

The typically-handheld mobile station diagrammatically depicted in FIG. 3 comprises a keypad 9, a display 10, a radio unit 11, a power source 12 and, as is conventional and known, various additional components necessary or common to its general operation and feature set but not otherwise herein described. Integrated with the power source 12 is a security module SM which comprises, as described hereinabove, encryption means 2 for encrypting electronic data transfer effected via the security module, for decrypting encrypted information or data and for generating an electronic signature when required, and a first connection interface IF1 for connecting the security module to the mobile station MS and/or to an external device (such as the service provider's terminal SP) to accommodate electronic data transfer, generally wireless data transfer.

The security module SM is preferably configured and arranged to process information transmitted by means of the mobile station via a telecommunication network and/or a local interface 13 of the mobile station. Thus, the security module is also operable to utilize the data transmission properties of the mobile station, as for example such that the security module first establishes a connection to the mobile station, and further to the service provider's terminal SP, using Bluetooth technology.

A contemplated exemplary use of the security system, security module and mobile station of the invention will now be described with reference to FIG. 2. A user wishing to load money or credit from his bank account to his electronic cash device, i.e. the mobile station, starts or otherwise operates the mobile station in a bank mode, whereupon the security module is activated and begins contacting other devices supporting the Bluetooth technology in the local or contemplated environment. This functionality may be implemented in the manner described in the Bluetooth specifications and protocol. With the security module SM1 connected to the user's mobile station MS and its cash card or smart card component SC detecting an on-line banking terminal SP, a secure connection with the banking terminal is initialized by transmitting the public key of the mobile station MS and/or security module SM1 and receiving the bank's public key. In this manner the user's security module SM1 and the on-line banking terminal's security module SM2 are able to employ encryption when exchanging messages. Using the keypad 9 and display 10 of the mobile station MS, the user enters or specifies the amount of money to be loaded or credited from his bank account, and this information is sent in encrypted form to the banking terminal SP. The banking terminal then asks the user to provide his electronic signature for verification, which the user transmits from the mobile station MS via the security module SM1.

When the on-line banking terminal SP has then approved the cash load operation, it transmits the specified sum to the user's smart card SC via the security modules SM1 and SM2 and updates the bank server 8 for this transaction. Although not described here, it will now be apparent that, with appropriate modifications, the above-described functionality and method steps may similarly be applied to a wide variety of services and vending operations.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A security module for use with a terminal device, comprising:
    a frame comprising a connection device arranged and dimensioned for connecting the security module to a receptacle on the terminal device;
    encryption means for encrypting electronic data transferred by the terminal device to the security module, for decrypting encrypted electronic data and for implementing an electronic signature, wherein said encryption means is arranged in said frame and comprises a processor for encrypting and decrypting electronic data and for implementing the electronic signature, and a memory connected to the processor for storing of encryption keys and parameters;
    a first connection interface arranged in said frame for effecting a wireless electronic data transfer communication connection between the security module and the external device, wherein said wireless electronic data transfer communication connection comprises a radio link; and
    a second interface arranged in said frame and dimensioned for receiving electrical operating power for the security module from the terminal device when said security module is connected to the receptacle on the terminal device by said connection device.

2. A security module in accordance with claim 1, further comprising a smart card component configured and operable for implementing smart card functions on the security module.

3. A security module in accordance with claim 1, wherein said first connection interface is configured for implementing a Bluetooth-based wireless data transfer communication connection.

4. In a security system for a service provider terminal and a service user terminal electrically interconnected via a predetermined communication link,
    a first security module connected to the service provider terminal, and
    a second security module connected to the service user terminal,
    said first and second security modules being configured for processing information transmitted between the service provider terminal and the service user terminal, and each of said first and second security modules comprising
    a frame having a connection device arranged and dimensioned for connection of said first and second security modules to respective receptacles on the service provider terminal and the service user terminal,
    encryption means for encrypting electronic data transferred via the each security module, for decrypting encrypted electronic data and for implementing an electronic signature, wherein said encryption means comprises a processor for encrypting and decrypting electronic data and for implementing the electronic signature, and a memory connected to the processor for storing of encryption keys and parameters,
    a first connection interface for effecting a wireless electronic data transfer communication connection between the each security module and the respective terminal of the other of said each security module, wherein said wireless electronic data transfer communication connection is a radio link, and
    a second interface for receiving electrical operating power for the each security module from a respective one of the service provider terminal and the service user terminal.

5. In the security system of claim 4, the service provider terminal comprising one of an online banking terminal, a cash register, and a vending machine.

6. In the security system of claim 4, the service user terminal comprising one of a mobile station and a portable computer.

7. In the security system of claim 4, a service provider server to which the first security module is connectable via a telecommunication network for updating, at the service provider server, functions executed from the service user terminal and for saving the updated functions to the service provider server.

8. In a mobile station operable for communication over a telecommunication network and having a keypad, a display, a radio unit, a power source, and a security module, the security module comprising:
    a frame including connection device arranged a dimensioned for connecting said security module to a receptacle on the mobile station;
    encryption means for encrypting electronic data transferred through the telecommunication network by the mobile station through the security module, for decrypting encrypted electronic data and for implementing an electronic signature, wherein said encryption means is arranged on said frame and comprises a processor for encrypting and decrypting electronic data and for implementing the electronic signature, and a memory connected to the processor for storing of encryption keys and parameters;

a first connection interface arranged in said frame and separate from said radio unit of said mobile station for effecting a wireless electronic data transfer communication connection between the security module and an external device, wherein said wireless electronic data transfer communication connection is a radio link; and a second interface arranged on said frame and dimensioned for receiving electrical operating power for the security module from the mobile station when said security module is connected to the receptacle on the mobile station by said connection means.

9. In the mobile station of claim 8, said security module being configured for processing information transmitted by the mobile station to one of the telecommunication network and a local interface of the mobile station.

10. In the mobile station of claim 8, said security module being configured for effecting said wireless electronic data transfer communication connection using a Bluetooth-based wireless data transfer communication connection.

11. A security module in accordance with claim 1, wherein said connection device for connecting the security module to the terminal device includes a wireless communication connection.

12. A security module in accordance with claim 1, wherein said radio link uses Bluetooth technology.

* * * * *